(12) United States Patent
North et al.

(10) Patent No.: US 6,291,370 B1
(45) Date of Patent: Sep. 18, 2001

(54) CHOPPED FIBERGLASS LAMINATE FOR AUTOMOTIVE HEADLINERS AND METHOD OF FABRICATION

(75) Inventors: John M. North, Valatie, NY (US); Frank C. Grace, North Dartmouth; Michael P. Albert, Newton, both of MA (US)

(73) Assignee: Harodite Industries, Inc., MA (US)

( * ) Notice: Subject to any disclaimer, the term of this patent is extended or adjusted under 35 U.S.C. 154(b) by 0 days.

(21) Appl. No.: 09/387,813

(22) Filed: Sep. 1, 1999

(51) Int. Cl.[7] .............................. B32B 27/04; B32B 5/12
(52) U.S. Cl. .................................. 442/58; 442/50; 442/54
(58) Field of Search .................................. 442/50, 54, 58

(56) References Cited

U.S. PATENT DOCUMENTS

| | | |
|---|---|---|
| 4,828,910 | 5/1989 | Haussling . |
| 4,840,832 | 6/1989 | Weinle et al. . |
| 5,486,256 | 1/1996 | Romesburg et al. . |
| 5,529,826 * | 6/1996 | Tailor et al. .......................... 428/110 |
| 5,582,906 | 12/1996 | Romesburg et al. . |
| 5,591,289 | 1/1997 | Souders et al. . |
| 5,660,908 | 8/1997 | Kelman et al. . |

* cited by examiner

Primary Examiner—Elizabeth M. Cole
Assistant Examiner—Ula C. Ruddock
(74) Attorney, Agent, or Firm—Cowan, Liebowitz, Latman, P.C.

(57) ABSTRACT

A chopped fiberglass containing laminate for fabricating sound absorbing moldable structures, such an automotive headliner is provided. The laminate includes a nonwoven fine denier thermoplastic fiber scrim, a thermoplastic barrier film on one surface and a layer of chopped fiberglass and powder adhesive on the exposed surface of the barrier film. The laminate is combined with a foam core, fiberglass layer and decorative fabric on the fiberglass layer to provide a composite having elongation exceeding 30% in both machine and transverse directions for forming the headliner. An apparatus and method for forming the laminate are so disclosed.

24 Claims, 2 Drawing Sheets

CHOPPED FIBERGLASS LAMINATE FOR AUTOMOTIVE HEADLINERS AND METHOD OF FABRICATION

BACKGROUND OF THE INVENTION

This invention relates to a chopped fiberglass trilaminate structure and a method of manufacture, and more particularly to a chopped fiberglass laminate having improved elongation for use in forming moldable headliners made from such structures for motor vehicles.

Prior art constructions of moldable headliners for trucks and automotive vehicles generally included a phenolic saturated fiberglass mat molded into a shell. In a secondary step, a cloth decorative outer layer, usually of a nylon tricot fabric backed with a 3 mm foam layer is attached to the shell. The foam helps to hide imperfections in the fiberglass shell.

The automotive industry recently has moved away from this construction to accepted European technology. This technology involves use of a multi-layered composite including a foam core and two outer layers of chopped fiberglass surrounding the foam core. The fiberglass is either chopped in place or provided in mat form and generally includes fiberglass yarns in tow form cut to about 1.27 to 10.16 cm (½ "to 4") long. This tri-laminate is saturated with an isocyanate resin which bonds the layers together during the molding process which forms the part into a shape to fit into a specific vehicle. The fiberglass layers on either side of the foam core are included to impart proper stiffness to the headliner part.

The European triplex construction is generally further sandwiched between outer film layers. These film layers act as barriers to prevent the liquid isocyanate resin from penetrating through the top layer which is the decorative fabric. Similarly, the film layer on the back of the part prevents the isocyanate from penetrating the backing mold release layer and contaminating the mold. If the liquid adhesive bleeds through the decorative fabric, it would be visible and a cause for rejection of the part, or it could cause sticking or attachment of the back side of the part to the mold.

There are ongoing efforts in the automotive industry to provide moldable headliner components which exhibit increased elongation in both the machine and transverse directions and to facilitate fabrication into severe curves and offsets during the curing process. Conventional glass fiber layers added to improve stiffening of the finished headliner generally are brittle thereby limiting the ultimate shape of the finished product.

One example of a commercial sound absorbing laminate is shown in U.S. Pat. No. 4,828,910 to Haussling. Here the laminate structure includes a reinforcing porous mat of chopped glass fiber integrally bonded to a resilient fibrous batt. A decorative cover sheet covers the exposed or exterior surface of the reinforcing mat all bonded together by a thermoset resin binder. The reinforcing mats sandwiching the fibrous batt are of glass fibers bonded together by a thermoformable resin to impart the required stiffness to the finished headliner. Finally, a porous cloth scrim as a release layer is adhesively secured to the back of the reinforcing mat by the thermoset resin coating the mat.

Another type of molded automobile headliner is shown in U.S. Pat. No. 4,840,832 to Weinle, et al. Here, the headliner is formed from a batt of polymeric fibers including at least a portion of potentially adhesive fibers. The finished headliner is characterized by being of a highly deformable resilient construction which facilitates installation in the vehicle. The fibers in the batt are bonded together at a multiplicity of locations which impart a self-supporting molded rigidity allowing the headliner to retain its shape when installed. A flexible foam layer is adhered to one surface of the flexible batt and the outer textile fabric is bonded to the foam layer.

Romesberg, et al. in U.S. Pat. Nos. 5,486,256 and 5,582,906 disclose a typical foam core I-beam type headliner having a layer of chopped fiberglass on both sides of a central foam core. The chopped fiberglass is applied at a first glass chopping stations onto a belt of adhesive film which becomes the back fiberglass layer and deposits a second fiberglass layer onto the front of the foam layer at a second glass chopping station. A wet adhesive is then applied onto the second fiberglass layer and a decorative fabric applied to the adhesive prior to molding.

U.S. Pat. No. 5,591,289 to Souders, et al describes another headliner based on a fibrous batt including binder fibers coated with a thermoset resin for imparting stiffness to the part. In U.S. Pat. No. 5,660,908 to Kelman, et al. A 100% polyethylene terephthalate (PET) headliner is formed from a fibrous batt having a plurality of impressions which are filled with PET filler and bonded to a PET scrim for imparting additional stiffness.

While the available constructions produce suitable composites, constructions that include glass fibers for stiffening the final product remain difficult to mold. Accordingly, it is desirable to provide a chopped fiberglass laminate for a moldable headliner which will provide a composite for molding having at least about 30 per cent elongation in both the machine and transverse directions, allow excellent conforming to deep-draw areas when molding and provide the required stiffness in the final headliner product.

SUMMARY OF THE INVENTION

Generally speaking, in accordance with the invention, a chopped fiberglass laminate for fabricating moldable structures and methods of fabrication of the laminate and headliner including the laminate are provided. The chopped fiberglass laminate is formed by feeding a continuous nonwoven scrim of fine denier synthetic fiber and a nonporous barrier film through nip rollers. Chopped fiberglass and adhesive are deposited on the moving barrier film and nonwoven scrim which is then heated in an oven, passed through pressure nip rollers, cooled and then wound in roll form for transport and use.

The chopped fiberglass laminate possesses elongation properties at break exceeding about 30 to 40% in both the machine and transverse directions. The fine denier synthetic fiber utilized in the nonwoven scrim is a spunbond fiber having a denier of between about 1.8 to 2.2 in order to impart the desired elongation properties.

A headliner composite is formed by combining the fiberglass laminate with a foam layer on the fiberglass surface, an additional fiberglass layer is disposed on the opposite surface of the foam and a decorative fabric which may include a foam backing is placed on the exposed fiberglass surface. This headliner composite is then ready for molding. The high elongation properties of the chopped fiberglass laminate provide excellent conformability to deep-draw areas in the mold.

Accordingly, it is an object of the invention to provide a scrim/barrier film/chopped fiberglass containing laminate structure having improved elongation properties.

Another object of the invention is to provide an improved chopped fiberglass containing laminate including a nonwoven scrim formed of fine denier spunbond synthetic fibers.

A further object of the invention is to provide an improved chopped fiberglass containing laminate including a nonwoven scrim formed of fine denier spunbond polyester fibers of about 1.8 to 2.2 denier.

Yet another object of the invention is to provide an improved chopped fiberglass containing laminate including a thermoplastic barrier film for adhering the chopped fiberglass thereto and providing a non-porous barrier to prevent mold contamination.

Yet a further object of the invention is to provide a method for fabricating a chopped fiberglass containing laminate with elongation at break exceeding 30 to 40% in both the machine and transverse directions and energy to break less than 20 lbf-in. in either direction.

Still a further object of the invention is to provide a method for forming the nonwoven scrim/barrier film/chopped fiberglass laminate which can be formed into a roll or sheeted for easy storage and transport prior to being combined to form an automotive headliner composite.

Still another object of the invention is to provide an apparatus for forming a nonwoven scrim/barrier film/chopped fiberglass laminate which can be stored in roll or sheet form.

Still other objects and advantages of the invention all or in part be obvious and all in part be apparent from the specification.

The invention accordingly comprises several steps and the relation of one or more of such steps with respect to each of the others, and the products which possess the characteristics, properties and relation of constituents (components), all as exemplified in the detailed disclosure hereinafter said forth, and the scope of the invention will be indicated in the claims.

BRIEF DESCRIPTION OF THE DRAWINGS

For a fuller understanding of the invention, references is had to the following description taken in connection with the accompanying drawings, in which.

DESCRIPTION OF THE PREFERRED EMBODIMENTS

Figure 1:
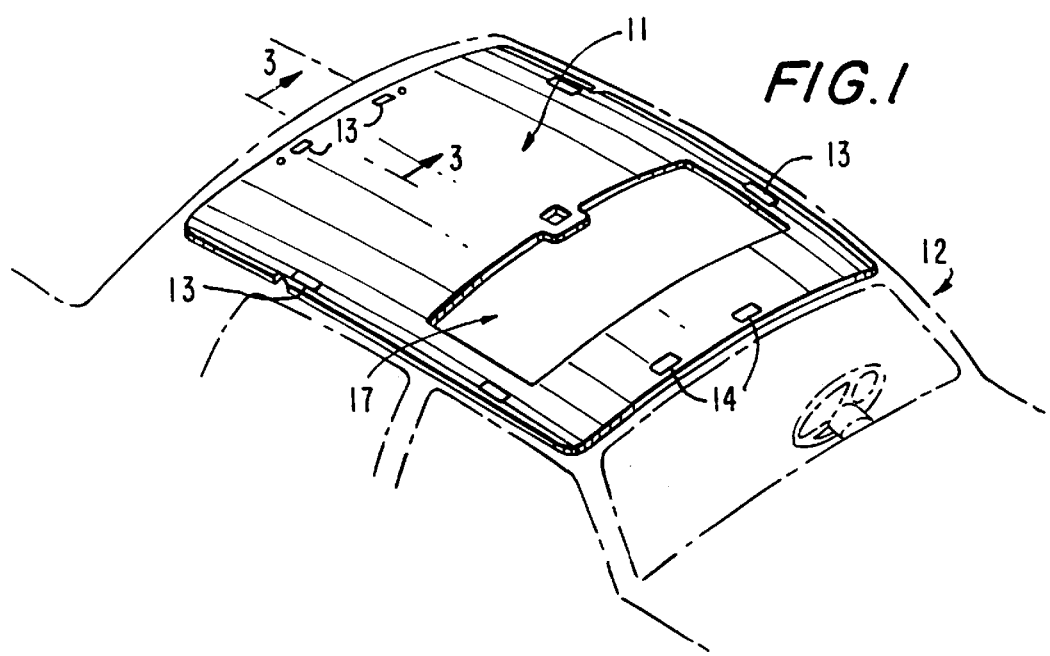
FIG. 1 is a perspective view from above a vehicle of a headliner including a chopped fiberglass/barrier film/scrim laminate constructed and arranged in accordance with the invention.
Figure 2:
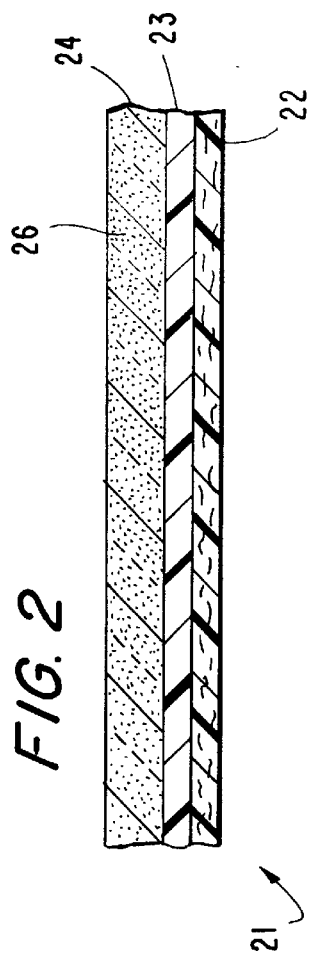
FIG. 2 is a partial cross-sectional view of the chopped fiberglass containing laminate constructed and arranged in accordance with the invention.

A headliner 11 constructed and arranged in accordance with the invention is shown mounted to the underside of the roof of an automobile vehicle 12 in FIG. 1. Headliner 11 may be fastened in a number of conventional ways at points 13 well known in the art and not described herein. These methods include adhesives, use of velcro attachments, fastener strips and various types of moldings. Headliner 11 may be molded in non-uniform thickness as shown in FIG. 2. Headliner 11 may also include various regions 14 for visors and a cut out region 16 for a dome lamp and a large open region 17 for a sunroof in a vehicle roof 15.

FIG. 2 illustrates in detailed cross-section the components of a chopped fiberglass containing laminate 21 constructed and arranged in accordance with the invention. Laminate 21 includes a nonwoven scrim 22, a barrier film 23 and a chopped fiberglass layer 24 including a thermoplastic adhesive 26. When assembled, nonwoven scrim 22 will be the back surface of headliner 11 adjacent to metal vehicle roof 18. Laminate 21 formed from nonwoven scrim 22, barrier film 23 and chopped fiberglass layer 24 in accordance with the process illustrated in FIG. 3 will provide significant advantages. These include a laminate that will impart stiffening properties when used as a component in an automotive headliner, eliminate possible resin bleed-through during post-lamination molding which often occurs, and have sufficient elongation properties that allows excellent conforming to deep-draw areas when molding.

Nonwoven scrim 22 used in forming laminate 21 is formed of a spunbond polyester fiber and has a weight between about 0.50–1.75 oz/yd$^2$ (17–60 g/m$^2$). Preferably, nonwoven scrim 22 has a weight between about 0.8–1.2 oz/yd$^2$ (27–41 g/m$^2$) and is 100% polyethylene terephthalate (generally referred to as polyester or PET) fiber. In the exemplary embodiment, nonwoven scrim is a 100% polyester spunbond fiber weighing 1.00 oz/yd$^2$ (34 g/m$^2$).

The polyester fiber used to make nonwoven scrim 22 is a spunbond PET fiber having a denier of between about 1.8–2.2. Utilizing a fiber with this fine denier, assists in providing nonwoven scrim 22 with non-bleed-through properties within the laminate. If coarser fibers are used to make a nonwoven scrim of the same weight, there is less surface area coverage in the nonwoven material. This decreased surface area would be accounted for in the larger diameter/denier fiber. Thus, fibers of between 1.8–2.2 denier increase the surface area which in turn decreases the permeability of nonwoven scrim 22. This reduction in permeability prevents barrier film 23 used in laminate 21 from bleeding through scrim 22 and inadvertently bonding to a molder's tool during thermal forming where tool temperatures are generally above the barrier film's melt temperature.

Barrier film 23 is formed of a thermoplastic film that may be formed of one or more layers. There are a wide variety of such barrier films available which are suitable for use in laminate 21. A particular film chosen will depend on the headliner manufacturer's tool and the molding conditions such as tool temperature and dwell time.

Whether a high heat stable film is used or a low heat stable film is used, the thickness of the film should be between about 1.0–2.0 mil (0.001–0.002"). Preferably, the thickness of barrier film 23 should be about 1.5 mil (0.0015"). The selected barrier film also has an effect on the elongation properties of the final composite and must be chosen according to the tool conditions and final composite stretch desired and required temperature resistance.

Barrier film 23 is nonporous and has a corona treated surface. This assists in bonding barrier film 23 to nonwoven scrim 22. The corona surface treatment aids in achieving a bond between the two layers which in turn plays an important role in achieving the desired stretch properties of final laminate 21. Corona treated side of barrier film 23 is laminated against nonwoven scrim 22.

Fiberglass layer 24 is formed by depositing chopped fiberglass on the exposed surface of barrier film 23. The fiberglass applied to barrier film 23 is chopped to provide a range of between about 30–200 g/m² of fiberglass with strands having a length between 1.0–4.0 inches in length. Preferably, the length of the chopped rovings is about 2.0 inches. Chopped glass fibers are applied to barrier film in a random fashion and is combined with an anti-static chemical sizing agent to reduce static buildup at the glass chopper.

Prior to completion of assembly of laminate 21, a thermoplastic adhesive is applied onto the chopped fiberglass randomly. If a powder resin is used as in the illustrated embodiment, the particle size used can range from about 100–500 microns having an average of about 200–300 microns. The resin adhesive is thermoplastic and can be, for example polyethylene, polyester, polyamide, or ethylene vinyl acetate. Generally, the amount of thermoplastic adhesive applied ranges from about 0.15–1.00 oz/yd² (5–43 g/m²). The actual amount of resin applied depends on the amount of fiberglass deposited on barrier film 23.

Figure 3:
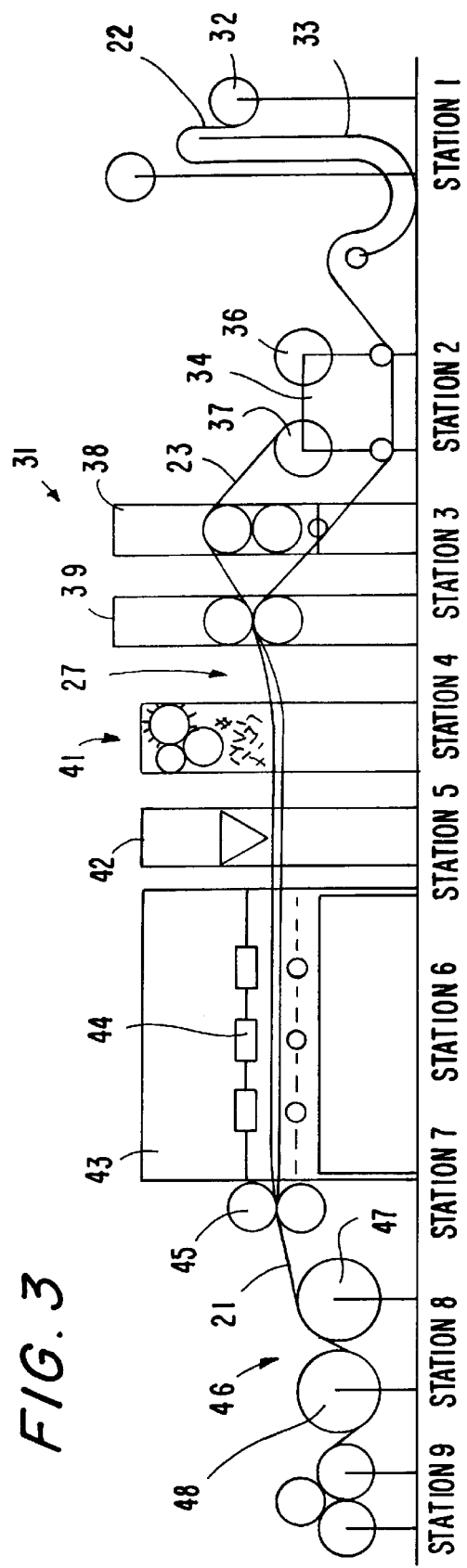
FIG. 3 is a schematic view illustrating the process, steps and equipment utilized in accordance with the invention to fabricate the laminate of FIG. 2.

FIG. 3 illustrates the process steps and an apparatus 31 utilized to fabricate laminate 21. Here, nonwoven scrim 22 wound on a scrim roll 32 at a scray 33 (Station 1) is fed with the rough side down is fed under a film stand 34. Film stand 34 includes a first film roll 36 and second film roller 37 (Station 2). In the embodiment illustrated in FIG. 3, one or both of film rolls 37 and 38 may be utilized for feeding barrier film 23. Two rolls allow for continuous feeding when one roll is empty, or for feeding multi-layer barrier films for forming laminate 21.

Barrier film 23 is fed over a third nip roller station 38 (Station 3) and nonwoven scrim 22 is fed below nip rollers 38. Nonwoven scrim 22 and barrier film 23 are both fed between a second pair of nip rollers 39 (Station 3) to form a loose barrier film/nonwoven scrim composite 27. Composite 27 is fed below a glass chopper dispenser 41 (Station) 4) where chopped fiberglass in the desired quantity is deposited on the exposed surface of barrier film 23. Composite 27 is then fed beneath a resin dispensing hopper 42 (Station 5) which deposits the desired amount of thermoplastic adhesive 26 onto chopped fiberglass layer 24 on barrier film 23.

Resin and fiberglass/barrier film/nonwoven composite 27 is then fed through an oven 43 (Station 6) where powder adhesive 26 and barrier film 23 is activated by the heat. Oven 43 may be of any suitable type, but configured so that heat is applied to composite 27. In the preferred embodiment illustrated in FIG. 3, oven 43 includes a number of electric infrared heating elements 44 which are located on the upperside of oven 43 to apply heat to the fiberglass side of composite 27 only. There is no direct heat being applied from the bottom to nonwoven scrim 22 of composite 27.

The oven heat is monitored by measuring the temperature of composite 27 as it exits oven 43. Depending on the particular barrier film, fiberglass and resin used, the oven temperature is monitored so that a bond is achieved between nonwoven scrim 22 and barrier film 23. At the same time, thermoplastic adhesive 26 melts and blends into the chopped fiberglass laying on barrier film 23. If the operating temperature of oven 43 exceeds the desired temperature, the barrier film will be activated and bonded too strongly to nonwoven scrim 22 thereby jeopardizing the deep draw and high stretch properties of finished laminate 21. The primary objective is to provide sufficient bond between barrier film 23 and nonwoven scrim 22 so that delamination does not occur before composite 27 is molded by the headliner manufacturer.

After thermoplastic adhesive 26 has been activated in oven 43 composite 27 is laminated at a first nip roller 45 (Station 7) to form laminate 21. First nip roller station 45 is maintained at a temperature just below room temperature and applies a downward pressure of between about 10–80 lbs/in² to composite 27. Preferably, between about 30–40 lbs/in² pressure is applied, and most preferably about 20 lbs/in² to form laminate 21. The actual pressure depends on the amount of fiberglass added at fiberglass chopper 41 and the thickness deposited on the barrier film 23.

If too much pressure is applied at first nip station 45 and the temperature of oven 43 exceeds the activation temperature of barrier film 23, the nip roller pressure will force the fiberglass into barrier film 23 and cause pinholes therein. If this occurs, the non-bleed-through properties of barrier film 23 would be lost. Use of a cool nip roller at first nip roller station 45 quickly solidifies thermoplastic adhesive 26 where lamination occurs.

Laminate 21 is then further cooled at a cooling station 46. Cooling station 46 includes a first cooling roller 47 and a second cooling roller at 48. Laminate 21 passes over first cooling roller 47 and under second cooling roller 48. Both rollers 47 and 48 are maintained below room temperature. Cooling rollers further cool laminate 21 and provide a desired amount of tension between cooling station 46 and a final batch roller 49 where laminate 21 is wound (Station 9).

EXAMPLE 1

A laminate formed utilizing the apparatus and process described in connection with FIG. 3 was evaluated. Evaluation was preformed by preparing a test solution of water, 1% by weight nonionic wetting agent and 1% by weight of any direct dye. The mixture includes the dye to provide easy visual evaluation of bleed-through properties. A sample of final laminate 21 is obtained at batch roller 49. Test solution is then spread on the chopped fiberglass side of laminate 21 using a piece of sponge. After letting the solution stand on laminate 21 for one minute, laminate 21 is turned over to determine whether the solution has bled through the layers.

Laminate 21 should not show any signs of solution bleed-through to the nonwoven scrim side. A positive test, or appearance of the dye on nonwoven scrim 22 indicates that there are holes produced in barrier film 23 during the lamination process.

Finished laminate 21 was then tested for physical properties on a tensile testing machine with an Instron 4400 Series Tester. A total of at least 5 samples were cut in the machine direction and transverse direction. The samples were then dye cut into a 1"×6" specimen side with the 6" length being the direction tested. This is a modified version of ASTM D 5035-95 Test Method For Break Force and Elongation of Textile Fabrics (Strip Test). An initial jaw gap of 1" over the chopped fiberglass length is used. If a 2" chopped fiberglass composite is produced the initial draw gap should be 3". This is to ensure that strands of chopped fiberglass will not be present in both the top and bottom testing jaw because this tends to cause inaccurate elongation results. Testing speed was 12 yds/min. Final elongation at break, not elongation at peak load, in both the machine direction and transverse direction of the final laminate exceeded about 30–40%. The energy to break has been calculated to be below 20 lbf-in. (This is not calculated at the peak load, but at the actual break of the laminate.)

EXAMPLE 2

Figure 4:
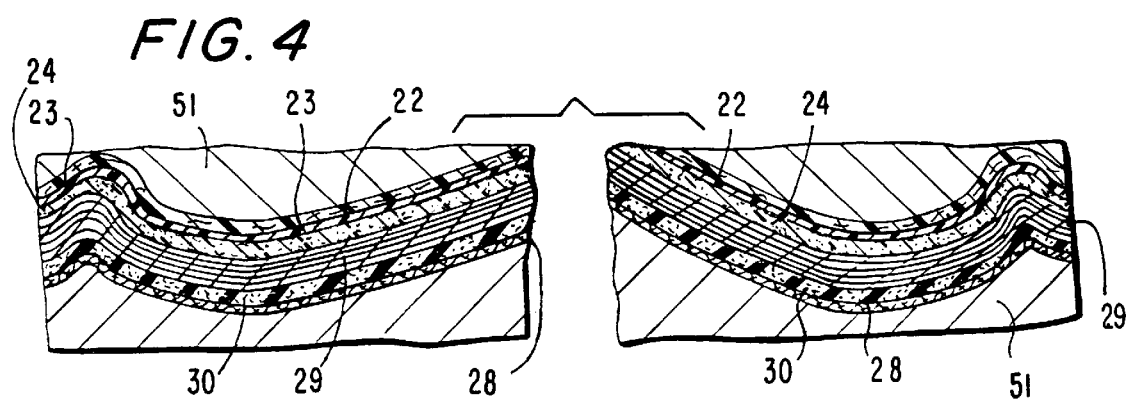
FIG. 4 is a partial cross-sectional view of the headliner components of FIG. 1 showing how the laminate and additional components are molded.
Figure 5:
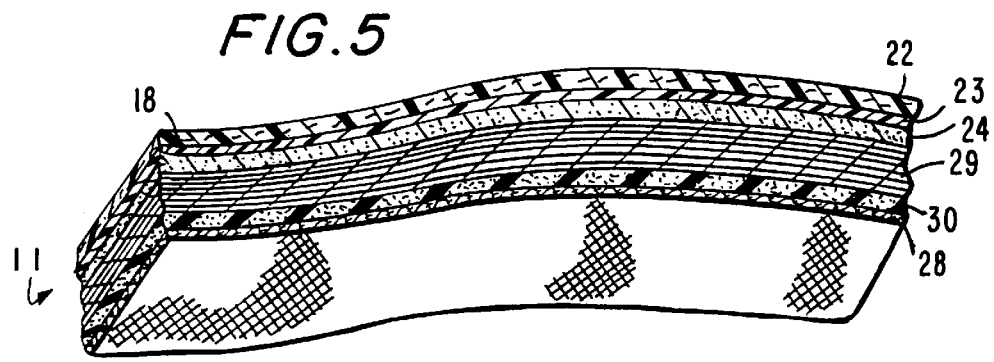
FIG. 5 is an enlarged partial sectional view of the headliner of FIG. 1 taken along line 5—5.

Fabrication of a headliner shown in FIG. 5 having an outer layer of a vinyl or decorative fabric 28 backed with a thin foam to mask surface irregularities is adhered to the outer surface of a foam core 29 impregnated with a liquid resin, such as an isocyanate as is well known in the art, and a second layer of glass fibers therebetween. The components are assembled in the order described above and placed within a mold 51 and closed as shown in FIG. 4. Mold 51 is heated to approximately 93° to 177° C. (200°–350° F.) for 1–10 minutes and the thermoplastic resins bond the layers together. On removal and cooling of the composite from the mold, the various layers are sufficiently adhered to each other so that the part may be utilized as a sound absorbing headliner in a motor vehicle. An alternative method involves preheating the composite to adhere the various layers and shaping the final part using a cold mold.

By providing a nonwoven scrim/barrier film/chopped fiberglass deposit web in accordance with the invention, several advantages for the construction of automotive headliners are obtained. Use of a fine denier spun bond fiber having a density in the range of about 1.8–2.2 results in a composite having an elongation at break exceeding about 30–40% in both the machine and transverse directions. The energy to break is less than about 20 lbf-in. in both directions.

Improved elongation properties coupled with the low energy to break, allows deep draw to be obtained in addition to the absence of pinholes or punctures in the barrier film preventing bleed-through of the barrier film or resin.

It will thus be seen that the objects set forth above, among those made apparent from the preceding description, are efficiently attained and since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

Particularly, it is to be understood that in said claims, ingredients or compounds recited in the singular are intended to include compatible mixtures of such ingredients wherever the sense permits.

What is claimed is:

1. A laminate containing chopped fiberglass for use in fabricating sound absorbing moldable structures, comprising:
   a nonwoven scrim of fine denier spunbond polyester fibers having a weight between about 17 to 60 grams per square meter (0.50 to 1.75 ounces per square yard) in the form of a sheet having a front planar surface and a rear planar surface;
   a non-porous thermoplastic barrier film having one corona treated surface disposed on the front surface of the nonwoven scrim with the corona treated surface facing the nonwoven scrim; and
   a layer of chopped fiberglass and thermoplastic adhesive disposed on the front surface of the barrier film.

2. The laminate of claim 1, wherein the spunbond polyester fibers have a denier between about 1.8 to 2.2.

3. The laminate of claim 2, wherein the scrim is polyethylene terephthalate having a weight of about 34 g/m$^2$ (1.00 oz/yd$^2$).

4. The laminate of claim 2, wherein the thermoplastic barrier film is a thermoplastic film having a thickness between about 25.4 to 50.8 microns (1.0 to 2.0 mil or 0.001 to 0.002").

5. The laminate of claim 4, wherein the fiberglass is chopped to a length between about 2.54 to 10.16 cm (1.0 to 4.0 inches).

6. The laminate of claim 5, wherein the chopped fiberglass layer has a weight between about 30 to 200 g/m$^2$ (0.7 to 4.7 oz/yd$^2$) randomly dispersed on the barrier film.

7. The laminate of claim 6, wherein the adhesive in the fiberglass layer is a powder having a particle size between about 100 to 500 microns (0.025 to 0.125" or 25 to 125 mils) dispersed therein.

8. The laminate of claim 4, wherein the thermoplastic film is a polyolefin film.

9. The laminate of claim 1, wherein the thermoplastic barrier film is selected form the group consisting of polyethylene film, polypropylene film, polyamide film, polyester film and combinations thereof.

10. The laminate of claim 1, having an elongation to break exceeding about 30–40% in both the machine and transverse directions and the energy required to break is less than about 20 lbf-in. in both directions.

11. A vehicle headliner, comprising a laminate of a nonwoven scrim of fine denier spunbond polyester fibers having a weight between about 17 to 60 grams per square meter (0.50 to 1.75 ounces per square yard) in the form of a sheet having a front planar surface and a rear planar surface;
   a nonporous thermoplastic barrier film having one corona treated surface disposed on the front surface of the nonwoven scram with the corona treated surface facing the nonwoven scrim; and
   a layer of chopped fiberglass and thermoplastic adhesive disposed on the barrier film.

12. A laminate containing chopped fiberglass for use in fabricating sound absorbing moldable structures, comprising:
   a nonwoven scrim of fine denier spunbond polyester fibers having a weight between about 17 to 60 grams per square meter (0.50 to 1.75 ounces per square yard) in the form of a sheet having a front planar surface and a rear planar surface;
   a nonporous thermoplastic barrier film having one corona treated surface disposed on the front surface of the non-woven scrim with the corona treated surface facing the nonwoven scrim;
   a layer of chopped fiberglass and thermoplastic adhesive disposed on the front surface of the barrier film;
   the components having been heated and subjected to pressure to form the laminate without puncturing the barrier film thereby providing a laminate having an elongation at break exceeding about 30–40% in both the machine and transverse directions with the energy required to break less than about 20 lbf-in. in both directions.

13. A laminate containing chopped fiberglass for use in fabricating sound absorbing moldable structures, comprising:
   a nonwoven scrim of fine denier spunbond polyester fibers having a weight between about 17 to 60 grams per square meter (0.50 to 1.75 ounces per square yard) in the form of a sheeting having a front planar surface and a rear planar surface;
   a non-porous thermoplastic barrier film disposed on the front surface of the nonwoven scrim;
   a layer of chopped fiberglass and thermoplastic adhesive disposed on the front surface of the barrier film; and
   the thermoplastic adhesive being a powder having a particle size between about 100 to 500 microns (0.025 to 0.125" or 25 to 125 mils).

14. The laminate of claim 13, wherein the spunbond polyester fibers have a denier between about 1.8 to 2.2.

15. The laminate of claim 14, wherein the scrim is polyethylene terephthalate having a weight of about 34 g/m$^2$ (1.00 oz/yd$^2$).

16. The laminate of claim 14, wherein the thermoplastic barrier film is a polyolefin film having a thickness between about 25.4 to 50.8 microns (1.0 to 2.0 mil or 0.001 to 0.002").

17. The laminate of claim 16, wherein the fiberglass is chopped to a length between about 2.54 to 10.16 cm (1.0 to 4.0 inches).

18. The laminate of claim 17, wherein the chopped fiberglass layer has a weight between about 30 to 200 g/m$^2$ (0.7 to 4.7 oz/yd$^2$) randomly dispersed on the barrier film.

19. The laminate of claim 16, wherein the thermoplastic film is a polyolefin film.

20. The laminate of claim 13, wherein thermoplastic barrier film is selected from the group consisting of polyethylene film, polypropylene film, polyamide film, polyester film and combinations thereof.

21. The laminate of claim 13, wherein the thermoplastic barrier film has one corona treated surface facing the nonwoven scrim.

22. The laminate of claim 13, having an elongation to break exceeding about 30–40% in both the machine and transverse directions and the energy required to break is less than about 20 lbf-in. in both directions.

23. A vehicle headliner, comprising a laminate of a nonwoven scrim of fine denier spunbond polyester fibers having a weight between about 17 to 60 grams per square meter (0.50 to 1.75 ounces per square yard) in the form of a sheet having a front planar surface and a rear planar surface;

a nonporous thermoplastic barrier film disposed on the front surface of the nonwoven scrim;

a layer of chopped fiberglass and thermoplastic powder adhesive disposed on the barrier film; and the thermoplastic adhesive being a powder having a particle size between about 100 to 500 microns (0.025 to 0.125" or 25 to 125 mils).

24. A laminate containing chopped fiberglass for use in fabricating sound absorbing moldable structures, comprising:

a nonwoven scrim of fine denier spunbond polyester fibers having a weight between about 17 to 60 grams per square meter (0.50 to 1.75 ounces per square yard) in the form of a sheet having a front planar surface and a rear planar surface;

a non-porous thermoplastic barrier film disposed on the front surface of the non-woven scrim;

a layer of chopped fiberglass and thermoplastic adhesive disposed on the front surface of the barrier film; and the thermoplastic adhesive being a powder having a particle size between about 100 to 500 microns (0.025 to 0.125" or 0.25 to 125 mils).

\* \* \* \* \*